United States Patent
Fichter

(10) Patent No.: US 6,416,285 B1
(45) Date of Patent: Jul. 9, 2002

(54) PROCESS FOR MANUFACTURING AN IMPELLER

(75) Inventor: Rolf Fichter, Fellbach (DE)

(73) Assignee: LTG Lufttechnische Komponenten GmbH (DE)

(*) Notice: Subject to any disclaimer, the term of this patent is extended or adjusted under 35 U.S.C. 154(b) by 0 days.

(21) Appl. No.: 09/533,330

(22) Filed: Mar. 23, 2000

(30) Foreign Application Priority Data

Mar. 24, 1999 (DE) .......................................... 199 13 259

(51) Int. Cl.[7] .............................................. F04D 29/26
(52) U.S. Cl. ................... 416/178; 416/187; 416/213 A; 29/889; 29/889.4
(58) Field of Search ................................ 416/178, 184, 416/187, 213 A; 415/53.1, 53.2, 53.3; 29/889, 889.4

(56) References Cited

U.S. PATENT DOCUMENTS

| 1,101,645 A |   | 6/1914  | Ljungstrum |         |
|-------------|---|---------|------------|---------|
| 2,637,489 A | * | 5/1953  | Place      | 416/184 |
| 2,915,240 A | * | 12/1959 | Kochevar et al. | 416/184 |
| 3,224,669 A |   | 12/1965 | Sprouse et al. |      |
| 4,041,593 A |   | 8/1977  | Wallman    |         |
| 4,079,488 A |   | 3/1978  | Yuda       |         |
| 5,827,046 A | * | 10/1998 | Konno et al. | 416/178 |

FOREIGN PATENT DOCUMENTS

| DE | 1965868   |   | 7/1971 |         |
|----|-----------|---|--------|---------|
| DE | 216886    |   | 1/1985 |         |
| DE | 1970557   |   | 8/1998 |         |
| GB | 1160751   |   | 8/1969 |         |
| JP | 52-19309 A| * | 2/1977 | 416/178 |
| JP | 53-7807 A | * | 1/1978 | 29/889.4|

* cited by examiner

*Primary Examiner*—Christopher Verdier
(74) *Attorney, Agent, or Firm*—Ostrolenk, Faber, Gerb & Soffen, LLP

(57) ABSTRACT

A method for producing a rotor of a fan, which has support disks and lamellae which each have a curved cross-sectional profile, is proposed. The method is distinguished by the fact that firstly the lamellae are pushed axially into receiving openings in the support disks. Then, the profile height of each lamella is increased as a result of the lamella being plastically deformed in the region of the receiving opening, in such a manner that the lamella becomes clamped in its receiving opening.

10 Claims, 5 Drawing Sheets

US 6,416,285 B1

PROCESS FOR MANUFACTURING AN IMPELLER

BACKGROUND OF THE INVENTION

The invention relates to a method for producing a rotor of a fan by applying lamellae to support disks and to such a rotor for a fan.

Rotors of the type described here are known. They comprise support disks and blade lamellae, for which receiving openings are formed in the support disks. To increase the section modulus of bending and torsion, it is known to equip the rotor with a continuous shaft for absorbing the drive forces. The shaft, which is arranged in the interior of the rotor and therefore in the air-flow path, affects the flow of air inside the rotor, with the result that the volumetric flow characteristic is undesirably affected and the efficiency of the cross-flow fan is reduced. Furthermore, rotors which have support disks and blade lamellae but do not have continuous shafts are known. In these rotors, at least one of the support disks, or alternatively a casing which accommodates the rotor, is provided with a bearing journal for holding the rotor in a rotationally movable manner, which journal can be connected to a drive of the cross-flow fan.

To connect the lamellae to the support disks, it is known to weld or solder the lamellae to the support disks. Furthermore, it is known to provide two support disks, which bear against one another and through the receiving openings (which are in the shape of a segment of a circle or a crescent) of which the lamellae are fitted, with holes which are offset with respect to one another and into which rivets are introduced, so that the support disks are displaced with respect to one another and, as a result, the lamellae are held clamped in the receiving openings. Threading the lamellae into the receiving openings has proven difficult. Moreover, it is known to deform the support disk on its circumference with the aid of rollers, in such a way that the play of the joint between the receiving opening and the lamella which has been fitted in is reduced until the lamella is held clamped in the receiving opening. In this form of clamped attachment, the lamella is not deformed, but rather only the support disk is deformed, so that even after the lamellae have been connected to the support disks the lamellae retain their cross-sectional profile which they possessed prior to joining. Moreover, it remains the case that there is only a force fit between the lamellae and the support disks. A drawback of all the known variants for connecting the lamellae to the support disks is that these methods are relatively complex and therefore expensive. Furthermore, it has been found that, with these methods for clamping the lamellae in place, in some cases not all the lamellae are clamped in sufficiently, and consequently they tend to rattle at least in some operating phases of the cross-flow fan.

Therefore, the object of the invention is to provide a rotor and a method for producing the rotor which do not have these drawbacks.

To achieve this object, a method is proposed that firstly the lamellae be pushed axially into the receiving openings in the support disks, and then the profile height of each lamella be increased by plastic deformation thereof in the region of the receiving opening, so that the lamella becomes clamped in its receiving opening. In this context, it is particularly advantageous that it is possible to achieve high tolerances between the receiving opening and the lamella, so that the lamella is easy to push axially into the receiving openings during assembly. As a result of the profile height being increased, it is also possible to compensate for high levels of play between the receiving opening and lamella in an advantageous way and to produce a form- and force-fitting connection between lamella and support disk. In an advantageous variant, the receiving openings for the lamella are designed in the shape of a sickle, making it possible to produce tighter tolerances (joint play) and therefore enabling the lamellae to bear more reliably against the edge of the receiving openings that with receiving openings which are in the shape of a segment of a circle or a crescent, as provided in the known rotors. The increase in the profile height of each of the lamellae with a curved cross-sectional profile also leads to an improvement in the stiffness properties, i.e. the section modulus of bending and torsion, of the rotor, since the height of the arch of the curved lamella is reflected in the section modulus to the third power.

In an advantageous embodiment of the method, the plastic deformation of the lamella takes place adjacent to at least one side, preferably to both sides, of the support disk. As a result, a region of the lamella which is arranged in the air flow path and is preferably only small is also locally deformed to a limited extent, in order to clamp the lamella in the receiving opening in the support disk. Although the locally limited change in the cross-sectional profile of the lamella which is associated with the deformation of the lamella affects or reduces the volumetric flow characteristic and the efficiency of the fan, preferably only slightly, the advantages which result from the increase in the curvature height, such as for example the increase in the stiffness of the rotor, far outweigh this problem.

Moreover, a preferred embodiment of the method is distinguished by the fact that, for the plastic deformation, the lamella—as seen in cross section—is subjected to deformation forces on its convex top side in its two edge regions and on its underside in its central zone. In this way, it is advantageously possible to achieve a form- and force-fitting three-point clamping or three-point support for the lamella at the edge of the receiving opening. This secure clamping of the lamella in the receiving opening enables high moments of resistance to be achieved by the rotor, which is advantageous in particular for the rotors of cross-flow fans, which have an unsupported structure and therefore do not have a continuous drive shaft.

To achieve the object, a rotor for a fan is also proposed wherein the rotor comprises at least two support disks which are arranged at a distance from one another, and a plurality of lamellae which pass through receiving openings in the support disks, each have a curved cross-sectional profile and are held clamped in the receiving openings. The rotor, preferably for a cross-flow fan, a radial fan or a cylindrical rotor, is distinguished by the fact that each lamella, as a result of plastic deformation which increases its profile height in the region of each support disk, is supposed on the edge of the receiving opening. As a result of this design, i.e. the increase in the curvature height of the lamellae in the region of the corresponding support disk, it is possible to increase the stiffness or elasticity properties of the rotor, in particular the section modulus to bending and torsion. In the context of the present invention, a "support" for the lamella in the receiving opening is understood to mean that the lamella, which consists of a material with a certain elasticity, is deformed beyond the elastic limit, in such a manner that the lamella is pressed onto a plurality of points and/or surfaces on the edge of the receiving opening. The increase in the profile height therefore results in the lamella becoming wedged in the receiving opening.

An exemplary embodiment of the rotor in which the support is a three-point support is also preferred. In this context, the term "point" is understood to mean not only punctiform contact between the lamella and the edge of the receiving opening, but also surface-to-surface contact, it being possible, for example, for surface-to-surface contact to be present at only one location of the three-point support, while at the other two bearing regions the contact is punctiform. The three-point support makes it possible to prevent the lamellae from becoming tilted or twisted in the receiving opening, which can lead to disturbing noise.

According to a refinement of the invention, stamped elevations, which bear against at least one side, preferably against both sides, of each support disk, are produced by the deformation forces for the plastic deformation. On the side which lies opposite a side of the lamella which has a stamped elevation, a recess in the form of a hollow suitably matched to the stamped elevation is formed after the deformation operation. These stamped elevations result in the support disk being held clamped between the stamped elevations, so that a relative movement of the lamella at least in the axial direction of the receiving opening in the support disk is prevented and the lamella is thus held captively.

Moreover, in a preferred exemplary embodiment of the rotor, the edge of the receiving opening cuts into the edge regions of the lamella so as to form an undercut. The fact that the edge cuts into the lamella at its edge regions adjoining the receiving opening means that lugs or deformed regions of the lamella which serve as lugs are formed, being folded or simply bent over in such a manner that the undercut is formed. As a result of these edge regions of the lamella being bent over, the latter is fixed in the receiving opening in the axial direction of the receiving opening, i.e. is held nondisplaceably in this direction.

Finally, another exemplary embodiment of the rotor which is preferred is one in which opposite zones of the edge of the receiving opening are deformed in opposite directions, transversely with respect to the plane of the support disks, in order to increase the clamped-in length of the lamella. The section modulus, i.e. the stiffness of the rotor, can be increased by a large clamped-in length. In an advantageous refinement of the invention, those zones of the edge of two receiving openings which adjoin one another are also deformed in opposite directions, transversely with respect to the plane of the support disks. The deformed edge zones of the receiving opening, which form recesses or elevations on the side faces of the support disks, are arranged alternately, i.e.—when only one of the side faces of the support disks is considered—a hollow recess is arranged between two elevations or an elevation is arranged between two recesses.

BRIEF DESCRIPTION OF THE DRAWINGS

The invention is explained in more detail below with reference to the drawings, in which.

DESCRIPTION OF PREFERRED EMBODIMENTS

Figure 1:
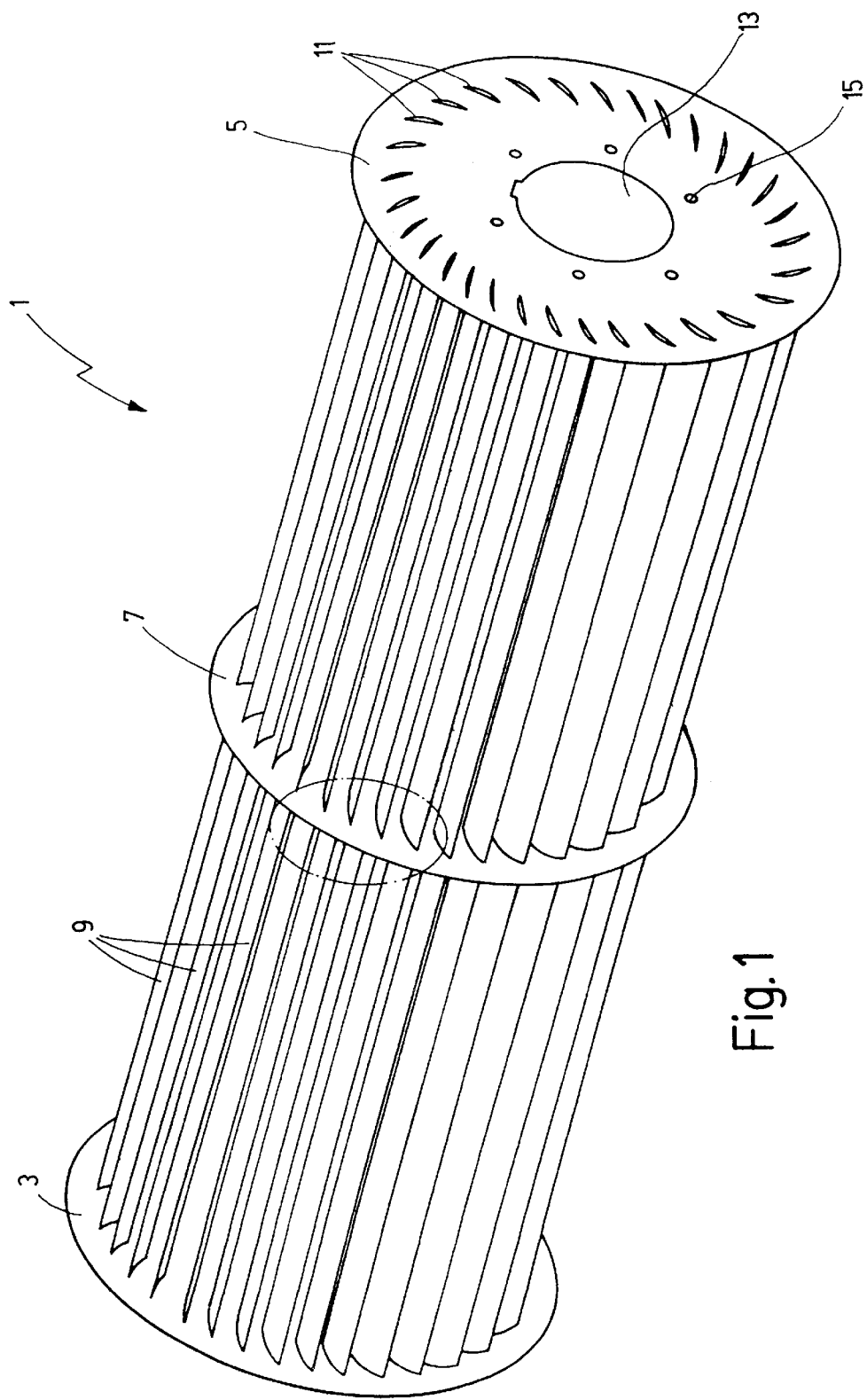
FIG. 1 shows a perspective illustration of a first exemplary embodiment of a rotor.

FIG. 1 shows a perspective illustration of an exemplary embodiment of a rotor 1 for a cross-flow fan which comprises a first support disk 3, a second support disk 5 and a third support disk 7, which are arranged at a distance from and parallel to one another. The function of a rotor for a cross-flow fan is known, and consequently does not need to be described in more detail here. Furthermore, the rotor 1 comprises a number of lamellae 9, which are also known as blades and pass through receiving openings 11 in the support disks 3, 5, 7. The receiving openings 11 are arranged at a distance from one another on an imaginary circle.

The rotor 1 has an unsupported structure, i.e. it does not have a continuous shaft. To apply a torque to the rotor 1, a shaft bushing, which is connected to a drive and is not shown in FIG. 1, is flanged onto one side face of one of the outer support disks 3, 5. For this purpose, a plurality of passage openings 15, which are arranged around an aperture 13, are provided at least in the support disks 3 and 5. Preferably, all the support disks 3, 5 and 7 of the rotor 1 are of identical design, reducing the variety of parts required for the rotor 1. The third support disk 7 serves essentially to improve the stiffness of the relatively long lamellae and therefore has at most a slight effect on the bearing of the rotor.

Figure 2:
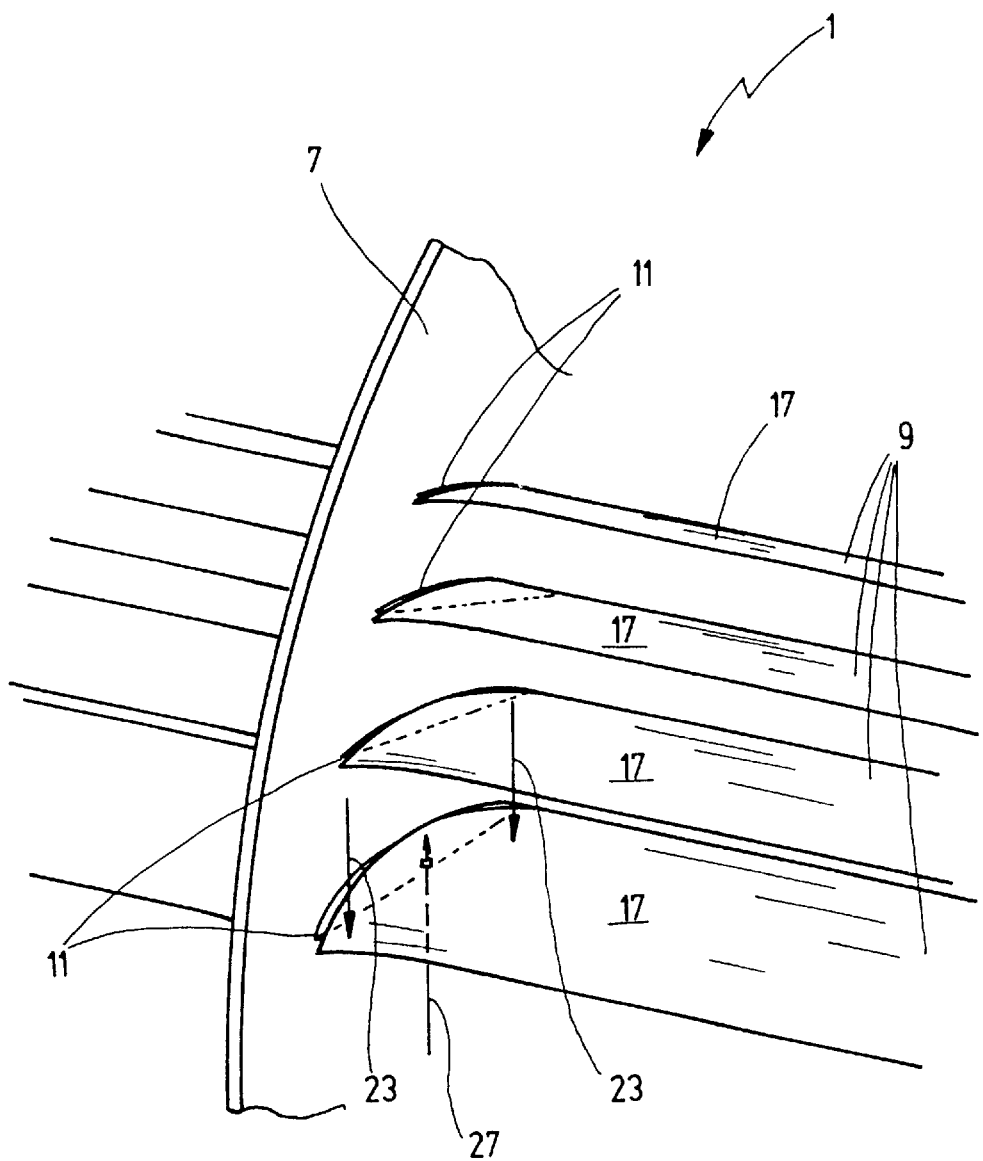
FIG. 2 shows a greatly enlarged excerpt of the rotor shown in FIG. 1.

FIG. 2 shows an excerpt of the rotor 1 illustrated in FIG. 1 in the region of the third support disk 7, which is arranged approximately in the center of the space between the first support disk 3 and the second support disk 5, on a greatly enlarged scale. In this figure, a total of four lamellae 9 can be seen, each passing through a receiving opening 11 in the support disk 7. It can be seen that, in this exemplary embodiment, the receiving openings 11 have a cross-sectional profile in the form of a segment of a circle, substantially corresponding to the curved cross-sectional profile of the lamellae 9. The lamellae 9 are held clamped in the receiving openings 11 in all the support disks 3, 5, 7. The lamellae 9 are clamped in the receiving openings 11 as a result of plastic deformation of the lamella 9 in the region of each support disk, with the result that the profile height, i.e. the height of the arch of the lamella 9 which has a curved cross-sectional profile, is increased. As a result, the lamella 9 is supported securely in the receiving opening 11.

The plastic deformation of the lamella 9 in the receiving opening 11 is explained in more detail below with reference to FIGS. 3A and 3B.

Figure 3A:
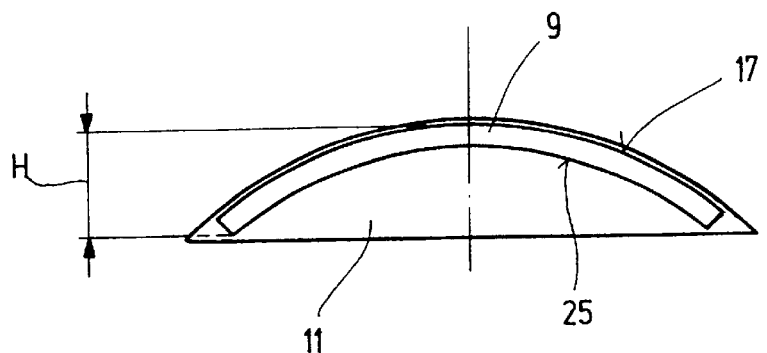
FIGS. 3A show a cross section through an exemplary embodiment of a lamella which is and 3B arranged in a receiving opening, before and after its plastic deformation.

FIG. 3A shows a cross section through a receiving opening 11 with a cross-sectional profile which is in the form of a segment of a circle and into which a lamella 9, which has a curved cross-sectional profile, is pushed in the axial direction. The lamella has a constant thickness. It can be seen that the curvature of the lamella 9, which is arranged with play in the receiving opening 11, is matched to the arc contour of the receiving opening 11, i.e. the top and bottom sides of the lamella run parallel to the arc of the receiving opening. The profile height H of the lamella 9, which is measured in the central region of the lamella, is smaller than the clear height of the receiving opening 11, so that the lamella 9 is arranged with play in the receiving opening 11.

Figure 3B:
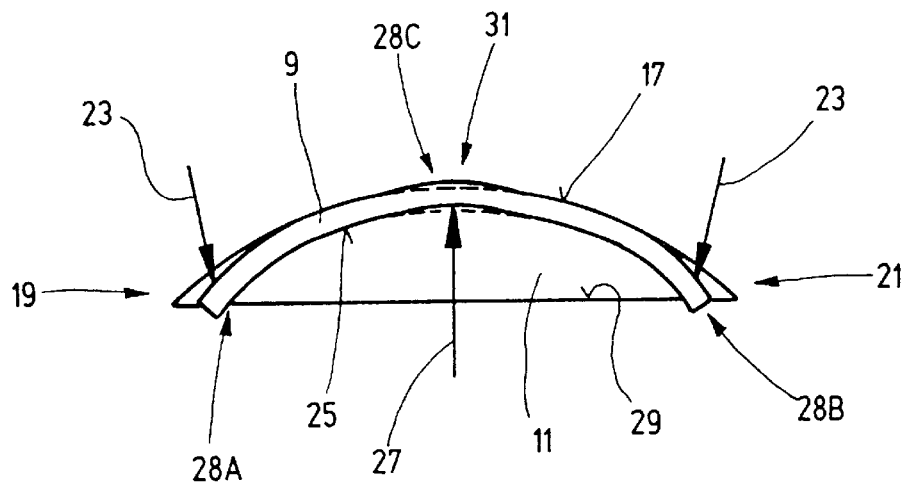

To increase the profile height H, the lamella 9, as illustrated in FIG. 3B, is subjected, on its convex top side 17 and on its two edge regions 19 and 21, to deformation forces which are indicated by arrows 23 and, on its concave underside 25, to deformation forces which are indicated by an arrow 27. It can be seen that the deformation forces applied to the top side 17 and the underside 25 are substantially oppositely directed to one another. During the deformation of the lamella, the rotor is substantially free of forces, unlike in the rotors which are known from the prior art, in which, to connect the lamellae and the support disks to one another, the support disks are subjected to great, radially directed forces with the aid of rollers. These radial forces acting on the rotor have to be supported by the machine for joining the rotor, requiring a solid structure. The height of the curvature of the lamella 9 is increased by the deformation forces, in such a manner that a three-point support is produced. This means that the lamella 9 has a first support point 28A at the edge region 19 of the lamella 9, a second support point 28B at the other edge region 21 of the lamella and a third support point 28C, the third support point 28C being a region of the surface on the convex top side 17 of the lamella 9 and the support points 28A and 28B being punctiform zones on the straight edge section of the receiving opening 11. It is clear that, as a result of the plastic deformation in this exemplary embodiment, the edge regions of the lamella 9 cut into the edge 29 of the receiving opening 11. It can also be seen in FIG. 3B that the deformation forces acting on the underside 27 of the lamella 9 are/were sufficiently high for the lamella 9 to have bulged out slightly in its central zone 31, in the same way as the edge region of the receiving opening 11 lying opposite the central zone 31.

When FIGS. 3A and 3B are compared, it becomes clear that essentially only the lamella 9 was deformed by the plastic deformation of the lamella 9 in order to clamp the latter in the receiving opening 11. The cross-sectional profile of the receiving opening 11 remains substantially the same before and after deformation of the lamella 9. Therefore, unlike in conventional rotors, the cross-sectional profile of the lamella 9 is changed, in particular its profile height H is increased. In the process, only those edge regions of the lamella which directly adjoin the receiving opening are affected by the deformation forces, i.e. are deformed. This deformation is only slight and is locally limited, so that it has only a slight effect on the efficiency of the rotor and the volumetric flow characteristic.

Figure 4A:
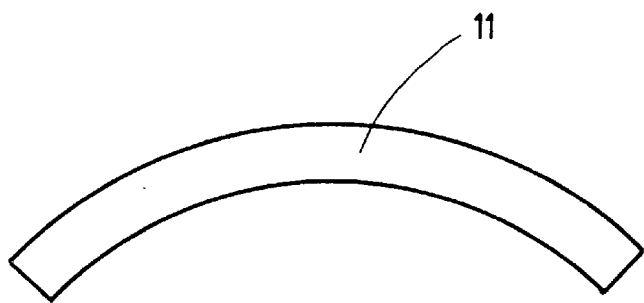
FIG. 4A show various embodiments of a receiving opening in a support disk for the to 4C lamella of a rotor.
Figure 4B:
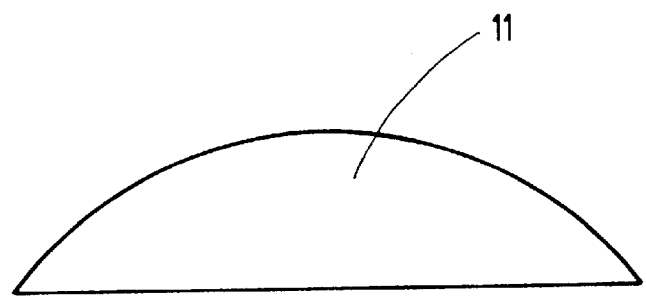
Figure 4C:
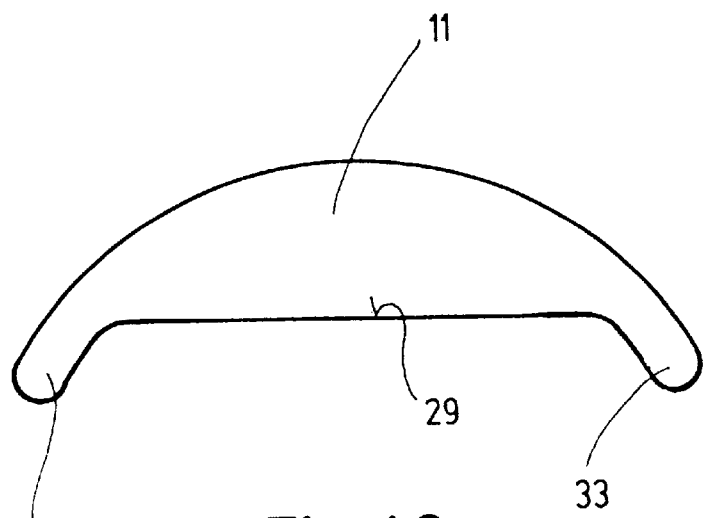

FIGS. 4A, 4B and 4C each show a cross section through an exemplary embodiment of a receiving opening 11. In the exemplary embodiment illustrated in FIG. 4A, the receiving opening 11 is designed in the shape of a sickle, the cross-sectional profile of the receiving opening 11 substantially corresponding to that of the lamella which can be pushed axially into the receiving opening 11 before it is plastically deformed in order to be clamped in the receiving opening 11. The receiving opening 11 illustrated in FIG. 4B has a profile in the form of a segment of a circle, corresponding to that of the receiving opening 11 illustrated in FIGS. 3A and 3B. FIG. 4C shows a receiving opening 11 which has a cross-sectional profile which is substantially in the form of a segment of a circle. In the region of the straight edge region of the receiving opening 11, i.e. the chord of the arc, slot-like recesses 33 are made in both edge regions at which the chord and the arc of the circle segment are connected to one another. In the event of plastic deformation of a lamella 9 which has been pushed into the receiving opening 11, this lamella is preferably subjected—as described with reference to FIGS. 3A and 3B—to deformation forces which increase the curvature of the lamella 9. The edge regions 19 and 21 of the lamella 9 are pressed into the recesses 33, preferably so as to form a form fit. In this way, it is possible to ensure a desired support, preferably three-point support, for the lamella 9 on the edge 29 of the receiving opening 11. Furthermore, the lamella which is arranged in the receiving opening 11 is also fixed transversely with respect to the direction in which it is pushed into the receiving opening.

Figure 5:
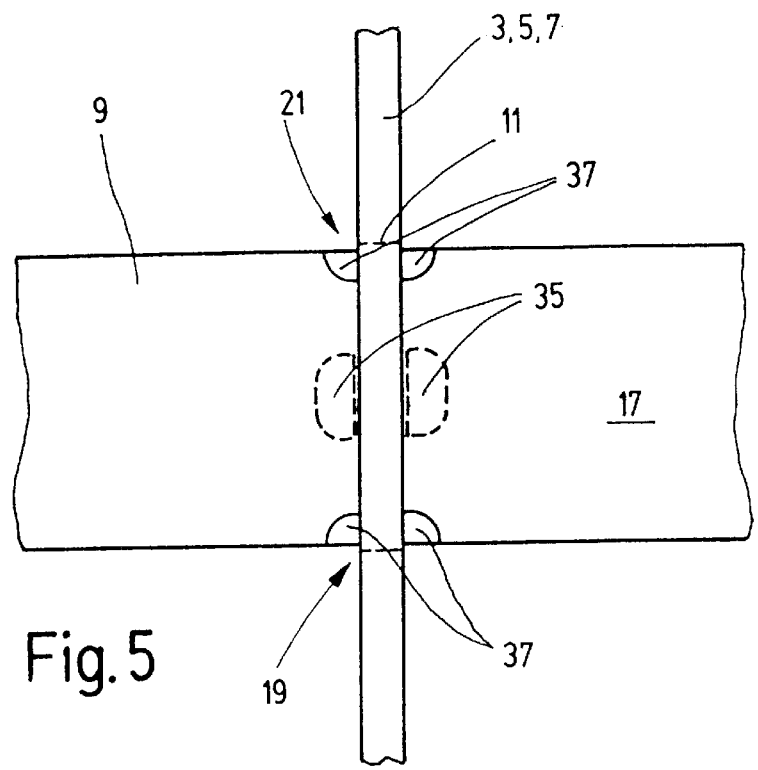
FIG. 5 shows an excerpt of a rotor in the region of a support disk in plan view onto the top side of a lamella.

FIG. 5 shows a plan view of a lamella 9 which is arranged, preferably with play, in a receiving opening 11 in one of the support disks of a rotor. In the region of the receiving opening 11, on both sides of the support disk 3, 5 or 7, regions 35 are indicated by a dashed line, in which regions the deformation forces illustrated by an arrow 27 in FIG. 3B act on the underside 25 of the lamella 9 in order to deform the latter in a desired way in order for it to be fixed in a form- and force-fitting way in the receiving opening 11. Furthermore, imaginary regions 37 in which the deformation forces acting on the convex top side 17 of the lamella 9 (arrow 23 in FIG. 3B) are active are indicated by a solid line in the edge regions 19 and 21 of the lamella 9, on both sides of the support disk 3, 5 or 7. It can be seen from FIG. 5 that the regions 35 and 37 where the forces act are arranged directly adjacent to the support disk or at the receiving opening 11, on both sides of the support disk.

Figure 6:
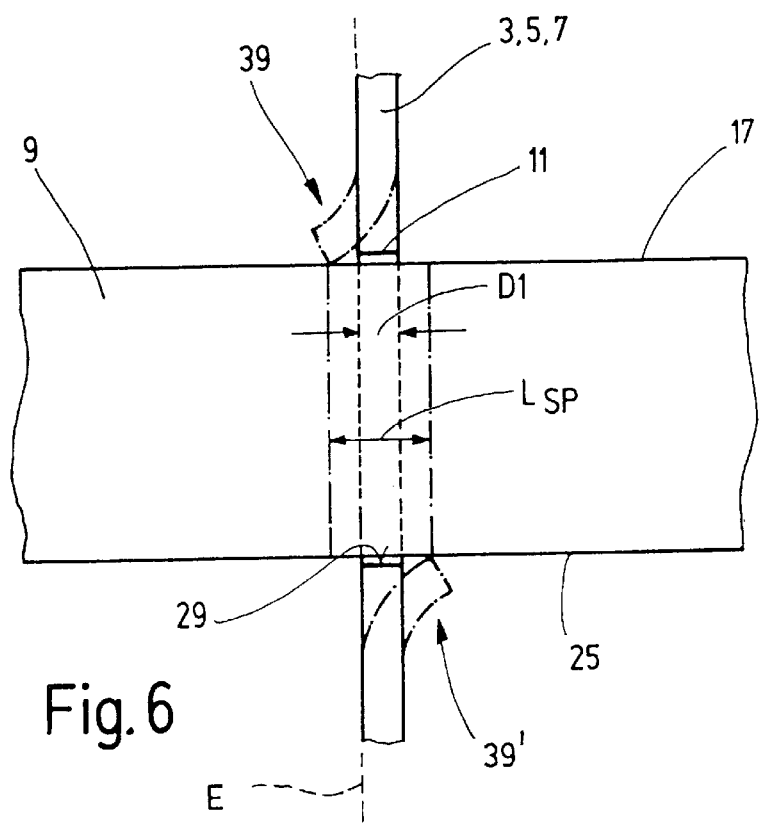
FIG. 6 shows a sectional illustration of part of a support disk in the region of a receiving opening for a lamella arranged in the latter.

FIG. 6 shows a cross section through a support disk 3, 5 or 7 of a rotor (not shown in more detail) as described with reference to the preceding figures, in the region of a receiving opening 11 in which a lamella 9 is arranged. The clamped-in length of a lamella 9 arranged in the receiving opening 11 amounts, in the planar regions of the support disk 3, 5 or 7, to approximately the thickness $D_1$ of the support disk. In an advantageous refinement of the invention, in order to increase the clamped-in length of the lamella 9, the support disk is deformed at opposite zones 39 and 39' of the edge 29 of the receiving opening 11, in opposite directions and transversely with respect to the plane E of the support disk 3, 5 or 7. In this way, the clamped-in length $L_{sp}$ of the lamella in the receiving opening can advantageously be increased significantly without having to use support disks of a greater thickness for this purpose. As a result of suitably designed formations being made in the edge region of the receiving opening 11, it is possible to increase the rigidity of the rotor. In the exemplary embodiment shown in FIG. 6, the thickness $D_1$ amounts to approximately half to two thirds the clamped-in length $L_{sp}$.

The tool which can be used for plastic deformation of the lamella 9—as described with reference to FIGS. 3A and 3B—is designed in the form of a pair of pliers and, at the regions where it bears against the lamella, is suitably matched to the cross-sectional shape of the lamella. When the pliers are closed, surface regions on the top and bottom sides of the lamella, preferably on both sides of the support disk, are subjected to deformation forces which generate desired plastic deformation.

The description of FIGS. 3 and 5 readily make apparent the method according to the invention, which consists in the fact that, after the lamellae have initially been pushed into the receiving openings in the support disks in the axial direction, the profile height of each lamella is increased through plastic deformation of the lamella in the region of the receiving opening, in such a way that the lamella becomes clamped in its receiving opening. In this way, it is possible to clamp the lamellae to the support disks in a relatively simple manner. Further treatment of the rotor after the plastic deformation is not required, so that the costs of the rotor can be reduced. The rotor is distinguished in particular by a high strength and preferably by good aerodynamic properties which are achievable particularly in rotors with an unsupported structure.

The rotor, which is mounted in a rotationally movable manner on one or two sides, may, for example, be made from stainless steel or aluminum. In this way, high strength properties can be achieved despite the low rotor density. The rotor may be a cross-flow fan rotor, a radial fan rotor or a cylindrical rotor.

A further advantage of the plastic deformation of the lamella in order for it to be supported in the receiving opening is that lamellae with a lower material thickness than those used in welded rotors can be used. Moreover, the production of the rotor can advantageously be automated. Furthermore, machines for joining the lamellae and support disks to form a rotor which has a simple structure can be used or produced.

What is claimed is:

1. A rotor for a fan comprising at least two support disks each having opposite surfaces and the disks being spaced at a distance from one another with respective surfaces facing toward each other, each disk having a plurality of receiving openings therein arranged around the disk, each receiving opening being shaped to receive a respective lamella therein;

a plurality of lamellae, with each lamella of the plurality being received in a respective one of the receiving openings of each of the disks; each lamella having a curved cross sectional profile which is both continuous and unslotted throughout its profile and being shaped to cooperate with the shape of the respective receiving openings therefor so that each lamella is held clamped in the respective receiving openings therefor in the disks, the receiving openings for each of the lamella being so shaped with respect to the curved cross sectional profile of the respective lamella that the respective receiving opening supports the lamella at a three point support in the respective openings.

2. The rotor of claim 1, wherein each lamella has a curved cross sectional profile defining opposite edge regions and a central zone between the edge regions and being curved to have a convex top side; and wherein the three point support, in cross section across each lamella, includes a first support point on one of the edge regions of the lamella, a second support point on the opposite edge region of the lamella and a third support point in the central zone of the convex top side of the lamella.

3. The rotor of claim 2, further comprising support disks having stamped deformed elevations deformed out of the plane of the support disk and disposed at at least one of the opposite sides of the support disks at the receiving opening for bearing against the lamella in the opening.

4. The rotor of claim 2, wherein the receiving opening includes an edge and the lamella is so shaped in the receiving opening that the edge of the receiving opening cuts into the edge region of the lamina defining an undercut.

5. The rotor of claim 2, wherein the receiving openings each have edges with opposite zones and the opposite zones of the receiving opening are deformed transversely with respect to a plane in which the support disk is disposed.

6. The rotor of claim 5, wherein the opposite zones are deformed out of the plane of the disk in opposite directions.

7. A method for producing a rotor of a fan, wherein the rotor comprises a plurality of spaced apart parallel support disks and comprises a plurality of lamellae each with a curved cross sectional profile extending between and supported by the support disks, wherein the support disks include openings therein each shaped for receiving one of the lamellae, the method comprising inserting each lamella into a respective receiving opening therefor in each of the support disks;

increasing the profile height of each lamella in the region of the respective receiving opening in each support disk by subjecting the lamella to deformation forces on the convexly curved top side of the lamella, at its two opposite edge regions and on its underside in its central zone between the edge regions such that the lamella cooperates with the opening in the disk to clamp the lamella in the receiving opening of the disk.

8. The method of claim 7, wherein each of the support disks has opposite sides and each lamella extends through the openings therefor in the support disks and extends at least to the opposite sides of each of the disks, wherein the plastic deformation of each lamella takes place adjacent to both sides of at least one of the disks.

9. The method of claim 8, wherein the deformation forces applied to the edge regions of each lamella are directed substantially toward one another.

10. The method of claim 9, wherein for plastic deformation, one of the edge regions of each lamella is subjected to a deformation force in the direction toward the other edge region of the lamella and the other edge region of the lamella is supported on the edge of the respective receiving opening for the lamella in the support disk.

* * * * *